UNITED STATES PATENT OFFICE.

EVA GOTTSCHALK, OF NEWARK, NEW JERSEY; MANUELITA GOTTSCHALK TITUS AND S. ROWLAND MONROE EXECUTORS OF SAID EVA GOTTSCHALK, DECEASED.

METHOD OF PRODUCING SYNTHETIC CAOUTCHOUC.

1,185,654. Specification of Letters Patent. Patented June 6, 1916.

No Drawing. Application filed May 17, 1911. Serial No. 627,865.

*To all whom it may concern:*

Be it known that I, EVA GOTTSCHALK, a citizen of the United States of America, and a resident of Newark, county of Essex, and State of New Jersey, have invented certain new and useful Improvements in Methods of Producing Synthetic Caoutchouc, of which the following is a specification.

My invention relates to the synthetic production of caoutchouc, and consists in the conversion thereto of one or more hydrocarbon compounds of the terpene group.

My invention also relates to production of an improved caoutchouc superior to natural caoutchouc, in that it contains substantially no resin and but a very small quantity of oxygen.

Caoutchouc has the molecular formula $(C_5H_8)_n$, that is to say, its formula is some multiple of $C_5H_8$, but so far as I am aware, does not exist in the unitary form of $C_5H_8$.

Isoprene has the molecular formula of $C_5H_8$, and I have found that upon the proper application of heat and pressure thereto, and particularly in conjunction with the employment of an acid reagent, the same can be readily polymerized into pure caoutchouc having probably the formula $(C_{10}H_{16})_n$.

As isoprene itself is somewhat expensive, I find it advantageous as one step in the process to produce the isoprene from other substances which are not so expensive, and as an important feature of my invention herein I break or crack pinene $(C_{10}H_{16})$ into a plurality of other hydrocarbon compounds of which the largest proportion is isoprene. Mixtures of the various other hydrocarbon compounds, in which are included pentene $(C_5H_{10})$, heptin $(C_7H_{12})$, toluene $(C_7H_8)$, metaxylene $(C_8H_{10})$, cymene $(C_{10}H_{14})$, terpilene $(C_{10}H_{16})$, and polyterpenes as for instance, $C_{20}H_{32}$, are also by the process which I will describe, converted into caoutchouc form, so that except for a small by-product 60 to 70 per cent. of the pinene is converted into rubber.

For commercial purposes I may use the ordinary turpentine of commerce and separate the pinene from the resin therein by fractional distillation. The pinene is readily distilled from the turpentine at a temperature of about 155 degrees centigrade, and in practice I have advantageously employed steam distillation for this purpose.

Having produced the pinene either from the turpentine or otherwise, I now proceed to crack or break it up into a plurality of the other hydrocarbon compounds mentioned, and the pinene may be treated in several ways for this purpose. As an example of one of the ways I vaporize the pinene and drive the vapors through a glass, porcelain, or sherardized metal tube, heating the same to a temperature ranging between 300 and 350 degrees centigrade. Thereafter these vapors are cooled quickly and the condensed liquid thus obtained is steam or otherwise distilled. The distillate is the mixture of hydrocarbons I require, the residue being principally tar.

Another method of cracking the pinene to produce the hydrocarbon compounds I require, is to place the pinene in a hermetically sealed vessel which is provided with a needle valve at the outlet, the discharge therefrom being connected with a condenser. The vessel is about half filled with pinene and heat is applied until the entire contents of the vessel are evenly heated throughout, to a temperature not exceeding 350 degrees centigrade. Then the needle valve is slightly opened and the vapors allowed to expand therethrough, and then the vapors are caused to condense as quickly as possible in the condenser. The resulting liquid is then steam or otherwise distilled as before, and the distillate comprises the hydrocarbon compounds as in the first described method.

The mixture of hydrocarbon compounds includes principally isoprene, together with small quantities of the pentene, benzene, heptene, toluene, metaxylene, cymene, terpilene, and polyterpenes, all of the compounds being hydrocarbons derived in this instance from turpentine. To this mixture, or if the material at this point be not obtained from cracking pinene as above disclosed, then to the desired hydrocarbon compound or compounds, I now add an acid reagent. This acid reagent may be one or more of several organic or inorganic acids, among which may be mentioned acetic acid, formic acid, tannic acid, hydrochloric acid, nitric acid, and hydrofluoric acid. Different proportions of these acids may be used, from one-half of one per cent. up to as high as ten per cent. So far I have found the best results from employing one-half of one per cent. of each of acetic and hydrofluoric acid, being one per cent. of the acid reagent as a whole, If these acids are chemically pure to start with, it is advantageous to employ some water, say, about ten per cent., though the amount of water employed, or indeed the employment of any water at all, is not essential.

Suitable closed vessels are conveniently provided for the mixture of hydrocarbon compounds and the acid reagent, the vessels being preferably about one-half filled with the mixture and then subjected to a heat varying from 175 degrees centigrade to 300 degrees centigrade, the temperature required depending upon the quantity or character of the acid reagent employed. Where one per cent. of the mixed acetic and hydrofluoric acids are employed as above stated, the temperature should be about 300 degrees centigrade, while if a larger proportion of the acid reagent is employed the temperature required will usually be less. The heating is continued for the required period, which period is variable but has been found usually to be from six to eight hours. Under the conditions mentioned the pressure in the vessels will rise at 300 degrees centigrade to about 350 pounds per square inch, and will remain at that pressure for a comparatively short time. Then though the mixture be maintained at a constant temperature the pressure will be seen to gradually drop, and in the course of time will drop down to around 160 pounds and at this point will remain stationary. Their remaining stationary is an indication that this part of the process is completed, and as said, this is usually after the expiration of six to eight hours.

It will be understood that the foregoing statement with regard to temperatures and pressures is solely for the purpose of fully explaining one example of my process and is not intended in any way as a limitation, for both temperatures and pressures vary greatly under different conditions. For instance,— if about three per cent. of the acid reagent be employed instead of one per cent. the temperature employed would probably be about 175 degrees, and at 175 degrees of temperature the maximum pressure obtained where the vessels are about half full, is about 225 pounds to the square inch, and this pressure drops down in the process to about 90 pounds per square inch. It will also be readily understood that if the vessels are more or less than half full the pressures will be different from those given, and still the process may be carried on, but during the course of many experiments I have found the example first given to be very successful in bringing about the conversion of a very high percentage of the original materials, into caoutchouc. It will also be understood that I may apply pressure in other ways than that above mentioned, but I have found that by hermetically sealing a vessel half filled with the liquid and then heating it to the required degree, the proper proportion of pressure is thereby developed, and hence this is a convenient method of applying the pressure.

In the process I have just described wherein pinene is first cracked or broken up into a plurality of other hydrocarbon compounds, the action of the acid, the heat, and the pressure thereon is to convert them into caoutchouc, while on the other hand, if a single hydrocarbon compound, such as isoprene, be employed, in which the formula is a factor of the rubber formula, the action is undoubtedly almost entirely one of polymerization. Where isoprene alone is employed I have found that a certain quantity thereof may be polymerized into caoutchouc by heat and pressure alone, without the use of the acid reagent at all. But I have found the use of the acid desirable because it increases and accelerates the polymerizing action, and increases the yield, and furthermore where the material being acted upon is derived from pinene, as above stated, it acts upon the other hydrocarbon compounds to recombine them in the required form. After this part of the process has been completed I allow the resulting mass to cool down, and then steam or otherwise distil it. The distillate, of which it may be said there is a very small quantity, is material similar to pinene or turpentine, and may be used for purposes for which turpentine is commonly used; while the remainder is pure india rubber or caoutchouc, in a viscid state. This viscid substance may be hardened by exposing it in thin layers to the oxidizing action of the air under a temperature not to exceed 135 degrees centigrade, this being similar to the method ordinarily employed for drying and oxidizing the natural viscid juices obtained from the rubber plants. The material thus produced can hardly be distinguished from pure Pará rubber, except for the fact that the smoky smell and to some extent color of the ordinary commercial caoutchouc, due to the smoke of the fire over which it is dried, is absent. This could be artificially supplied for the purpose of the more closely simulating the natural rubber if the same were found to be desirable.

Other distinctions, important commercially but not noticeable to the eye however, are that the caoutchouc thus produced contains no resin and but a very small quantity of oxygen. Ordinary commercial rubber always contains resin, and likewise always contains a higher quantity of oxygen than is desirable, usually from six per cent. upward. The resin has a deleterious effect upon the rubber and is undesirable, but it is always present in the natural rubber because it is contained in the viscid juices of the plants. The presence of oxygen is undesirable because it tends to oxidize the rubber and shorten its life. In producing synthetic rubber by my process the amount of oxygen present does not exceed four per cent., and this alone is a valuable feature of my invention.

In speaking of steam or other distillation, it will of course be understood that any of the well-known methods or processes in this respect may be used, but I have found steam distillation to be desirable as affording a ready means of controlling the temperature of the material and preventing it from rising to a point at which it (the material) would be injured for my purpose.

What I claim is:

1. A process which comprises heating in a closed vessel a distillate,—obtainable by cracking pinene into various hydro-carbons, and distilling said hydro-carbons;—thereby creating pressure and maintaining the temperature constant while the pressure drops and until said pressure reaches a point where it remains substantially constant.

2. A process which comprises adding an acid reagent to a distillate,—obtainable by cracking pinene into various hydro-carbons and distilling said hydro-carbons;—heating the resultant mixture in a closed vessel, thereby creating pressure, and maintaining the temperature constant while the pressure drops and until said pressure reaches a point where it remains substantially constant.

3. A process which comprises adding an acid reagent to a distillate,—obtainable by cracking pinene into various hydro-carbons and distilling said hydro-carbons;—heating the resultant mixture in a closed vessel, thereby creating pressure, and maintaining the temperature constant while the pressure drops and until said pressure reaches a point where it remains substantially constant, and distilling off the volatile matter.

4. A process which comprises adding an acid reagent to a distillate,—obtainable by cracking pinene into various hydro-carbons by passing it in the form of vapor through a tube heated to a temperature of between 300 degrees centigrade and 350 degrees centigrade, and then cooling quickly, distilling said hydro-carbons;—heating the resultant mixture in a closed vessel, thereby creating pressure and maintaining the temperature constant while the pressure drops and until said pressure reaches a point where it remains substantially constant, distilling off the volatile matter, and oxidizing the residue.

5. A process which comprises adding an acid reagent to a distillate,—obtainable by distilling turpentine, cracking the resulting liquid into various hydro-carbons and distilling said hydro-carbons;—heating the resultant product in a closed vessel, thereby creating pressure, and maintaining the temperature constant while the pressure drops and until said pressure reaches a point where it remains substantially constant.

6. A process which comprises adding an acid reagent to a distillate,—obtainable by distilling turpentine, cracking the resulting liquid into various hydro-carbons, distilling said hydro-carbons and condensing the hydro-carbons;—heating the resultant mixture in a closed vessel, thereby creating pressure, and maintaining the temperature constant while the pressure drops and until said pressure reaches a point where it remains substantially constant.

7. A process which comprises adding an acid reagent to a distillate,—obtainable by distilling turpentine by fractional distillation at a temperature of approximately 155 degrees centigrade, cracking the resulting liquid into various hydro-carbons by passing it in the form of vapor through a tube heated to a temperature of between 300 degrees centigrade and 350 degrees centigrade, and then cooling quickly and distilling said hydro-carbons;—heating the resultant mixture in a closed vessel, thereby creating pressure, and maintaining the pressure constant while the pressure drops and until said pressure reaches a point where it remains substantially constant, distilling off the volatile matter, and oxidizing the residue.

8. A process which consists of adding an acid reagent to hydro-carbon compounds obtained by cracking pinene, and then applying heat and pressure to the mixture, to produce caoutchouc.

9. A process which consists in adding an acid reagent to hydro-carbon compounds obtained by cracking pinene, and subjecting the mixture to the action of heat in a closed vessel, to produce caoutchouc.

10. A process which consists of adding an acid reagent to hydro-carbon compounds obtained by cracking pinene, subjecting the mixture to the action of heat not exceeding 300 degrees centigrade while contained in a closed vessel, to produce caoutchouc.

11. A process which consists in adding an acid reagent to a distillate,—obtainable by cracking pinene into other hydro-carbon compounds and distilling the same;—subjecting the mixture to the action of heat not exceeding 300 degrees centigrade in a closed vessel, cooling the product, and then concentrating the same.

12. A process which consists in adding an acid reagent to a distillate,—obtainable by cracking pinene into other hydro-carbons and distilling the same;—subjecting the mixture to the action of heat not exceeding 300 degrees centigrade in a closed vessel, cooling the product, and then concentrating the same by steam distillation.

13. A process which consists of adding an acid reagent to a distillate,—obtainable by heating pinene to a temperature not exceeding about 350 degrees centigrade, to break it up into a plurality of other hydro-carbon compounds, and then quickly cooling the same and distilling;—and in then heating the mixture under pressure, to produce caoutchouc.

14. A process which consists in adding an acid reagent to a distillate,—obtainable by heating pinene to a temperature not exceeding about 350 degrees centigrade to break it up into a plurality of other hydro-carbon compounds and then quickly cooling the same and steam distilling said compound;— and in then heating the mixture in a closed vessel to a temperature not to exceed about 300 degrees centigrade, to produce caoutchouc.

15. A process which consists in adding an acid reagent to a distillate,—obtainable by heating pinene to a temperature not exceeding about 350 degrees centigrade to break it up into a plurality of other hydro-carbon compounds, and then quickly cooling the same, and steam distilling said compounds;—and in then heating the mixture in a closed vessel to a temperature ranging between 175 degrees centigrade and 300 degrees centigrade, to produce caoutchouc.

16. A process which consists in adding an acid reagent to a distillate,—obtainable by heating pinene to a temperature not exceeding about 350 degrees centigrade to break it up into a plurality of other hydro-carbon compounds, in then quickly cooling the same and steam distilling said compounds;—and in then heating the mixture to a temperature not to exceed about 300 degrees centigrade under a pressure not to exceeed about 350 pounds per square inch, to produce caoutchouc.

17. A process which consists of adding an acid reagent to a distillate,—obtainable by heating pinene to a temperature not exceeding about 350 degrees centigrade to break it up into a plurality of other hydro-carbon compounds, in then quickly cooling the same, and steam distilling said compounds;—and in then heating the mixture to a temperature ranging between about 175 degrees centigrade and about 300 degrees centigrade, and under a pressure produced by inclosing the mixture while being heated in a closed vessel of about twice the capacity of the said mixture.

18. A process which consists in converting a plurality of hydro-carbon compounds of the terpene series into caoutchouc by the employment of an acid reagent and applying heat and pressure.

19. A process which consists in adding to a plurality of hydro-carbon compounds of the terpene series, a relatively small percentage of an acid reagent, and applying heat and pressure to the mixture to produce caoutchouc therefrom.

20. A process which consists in converting a plurality of hydro-carbon compounds of the terpene series into caoutchouc, by adding an acid reagent thereto and applying heat and pressure to the mixture while the same is contained in a closed vessel.

21. A process which consists in converting a plurality of hydro-carbon compounds of the terpene series into caoutchouc, by adding an acid reagent thereto and applying heat and pressure to the mixture while the same is contained in a closed vessel of a capacity about double that of the mixture contained therein.

22. A process which consists in converting a plurality of hydro-carbon compounds of the terpene series into caoutchouc, by adding an acid reagent thereto and applying heat and pressure to the mixture, the heat ranging from about 175 degrees centigrade to about 300 degrees centigrade.

23. A process which consists in converting a plurality of hydro-carbon compounds of the terpene series into caoutchouc, by adding an acid reagent thereto and applying heat and pressure to the mixture, the heat ranging from about 175 degrees centigrade to about 300 degrees centigrade, the pressure thereof being that produced by inclosing the mixture while it is being heated in a hermetically sealed vessel.

24. A process which consists in converting a plurality of hydro-carbon compounds of the terpene series into caoutchouc, by adding an acid reagent thereto and applying heat and pressure to the mixture, the heat ranging from about 175 degrees centigrade to about 300 degrees centigrade, the pressure thereof being that produced by inclosing the mixture while it is being heated in a hermetically sealed vessel of about twice the capacity of the mixture contained therein.

25. A process which consists in adding to a plurality of hydro-carbon compounds of the terpene series, a relatively small percentage of acetic and hydrofluoric acids, and applying heat and pressure to the mixture, for the purpose set forth.

EVA GOTTSCHALK.

Witnesses:
D. HOWARD HAYWOOD,
LYMAN S. ANDREWS, Jr.